United States Patent
Ooura et al.

(10) Patent No.: US 6,433,074 B1
(45) Date of Patent: Aug. 13, 2002

(54) PROCESS FOR PRODUCING VINYL CHLORIDE POLYMER

(75) Inventors: Makoto Ooura, Hasaki-machi; Tadashi Amano, Kamisu-machi, both of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/634,638

(22) Filed: Aug. 8, 2000

(30) Foreign Application Priority Data

Aug. 9, 1999 (JP) .......................................... 11-225598

(51) Int. Cl.[7] ................................................ C08K 5/13
(52) U.S. Cl. ........................ 524/741; 524/349; 524/351; 524/352; 524/736
(58) Field of Search ................... 526/84, 344; 524/291, 524/343, 303, 304, 330, 736, 741, 349, 351, 352; 570/105, 264; 568/780, 788

(56) References Cited

U.S. PATENT DOCUMENTS

| | | | |
|---|---|---|---|
| 2,581,907 A | * 1/1952 | Smith et al. | |
| 4,283,514 A | * 8/1981 | Weimer et al. | |
| 4,324,874 A | * 4/1982 | Cordes et al. | ................. 526/84 |
| 4,477,638 A | * 10/1984 | Reid | ............................ 526/84 |
| 4,478,986 A | * 10/1984 | Reid | ............................ 526/84 |
| 4,482,684 A | * 11/1984 | Gardner et al. | ................. 526/84 |
| 4,619,978 A | * 10/1986 | Reid | ............................ 526/84 |
| 4,748,218 A | * 5/1988 | Sharaby | ........................ 526/84 |
| 5,011,897 A | 4/1991 | Amano et al. | |
| 5,098,945 A | * 3/1992 | Pitteloud et al. | .............. 524/304 |
| 5,159,032 A | * 10/1992 | Amano et al. | ................. 526/84 |
| 6,022,932 A | 2/2000 | Ooura et al. | |

FOREIGN PATENT DOCUMENTS

| | | | |
|---|---|---|---|
| DE | 1 269 350 | 5/1968 | |
| EP | 0 281 210 | 9/1988 | |
| EP | 0406169 | * 6/1990 | |
| EP | 0 600 696 | 6/1994 | |
| GB | 1 536 399 | 12/1978 | |
| JP | 64-66206 | * 3/1989 | ................. 526/207 |

OTHER PUBLICATIONS

Piotrorskii et al—"Auxiliary Substances for Polymeric Materials" p. 27, of English Translation by R.J. Moseley, Jun. 1967.*

F. Cortolano, et al., Ciba Specialty Chemicals Corporation, "Partially Hindered Phenolics Effective as Chain Terminators and Antifoulling Agents for PVC During Polymerization and as Residual Antioxidants and Color Improvers for PVC Resin", Research Disclosures, No. 40872, p. 386, (Apr. 1998) Item No. XP–000824625.

* cited by examiner

Primary Examiner—Peter Szekely
(74) Attorney, Agent, or Firm—Oblon, Spivak, McClelland, Maier & Neustadt, P.C.

(57) ABSTRACT

Provided is a vinyl chloride polymer production process comprising the steps of polymerizing in an aqueous medium a vinyl chloride monomer alone or a mixture of monomers including the vinyl chloride monomer, and adding an antioxidant to starting materials or a polymerization reaction mixture. As the antioxidant, a mixed antioxidant comprised of an antioxidant A which is liquid at 20° C. and an antioxidant B which is powdery at 20° C. is used. This process is well operable, enables polymerization to be sufficiently terminated using an antioxidant in a small quantity and enables production of vinyl chloride polymers having less uneven plasticizer absorption and having both good anti-initial-discoloration properties and good thermal stability.

11 Claims, No Drawings

PROCESS FOR PRODUCING VINYL CHLORIDE POLYMER

BACKGROUND OF THE INVENTION

1. Field of the Invention

This invention relates to a process for producing a vinyl chloride polymer, and more particularly to a process for producing a vinyl chloride polymer having less uneven plasticizer absorption and having both good anti-initial-discoloration properties and good thermal stability.

2. Description of the Prior Art

In a processes for producing a vinyl chloride polymer by polymerizing in an aqueous medium a vinyl chloride monomer alone or a monomer mixture of a vinyl chloride monomer and a monomer copolymerizable with it, an antioxidant is conventionally added in order to, e.g., improve the anti-initial-discoloration properties and thermal stability of the vinyl chloride polymer obtained and to keep the polymerization conversion constant to lessen any uneven plasticizer absorption of the polymer. In some cases, this antioxidant is added in order to terminate reaction urgently at the time of abnormal reaction.

With regard to the time at which the antioxidant is to be added, it is added, e.g., before polymerization is initiated, before the pressure in a polymerization vessel (hereinafter "internal pressure") changes during polymerization, at the time the internal pressure has dropped at the last stage of polymerization, or before, in the course of or after the recovery of residual unreacted monomers after polymerization is completed. In particular, since the antioxidant has the action to terminate polymerization, it is usually added to a polymerization mixture at the time the internal pressure has dropped at the last stage of polymerization, also aiming at the termination of polymerization. As methods of adding the antioxidant, it is proposed to use, e.g., (1) a method in which an antioxidant which is liquid at normal temperature (20 to 25° C.; the same applies hereinafter) is directly added in a polymerization mixture (Japanese Post-Examination Publication (Kokoku) No. 7-113041), (2) a method in which an antioxidant which is powdery at normal temperature is dissolved in an organic solvent such as methanol or toluene and the resultant solution is press-added by means of a pump, and (3) a method in which the powdery antioxidant is press-added as an aqueous dispersion by means of a pump, by the aid of an emulsifying agent or a suspending agent (Japanese Post-Examination Publication (Kokoku) No. 5-86407).

The antioxidants used in these methods of addition are proposed in a large number. However, these antioxidants have performances individually specific to themselves. For example, some have an insufficient ability of polymerization termination but are well operable as being liquid and provide a low COD (chemical oxygen demand) in waste water after polymerization; some have a sufficient ability of polymerization termination but lowers the anti-initial-discoloration properties and thermal stability of polymers; and some are powdery and must be dissolved in an organic solvent, resulting in a high COD in polymerization waste water. Thus, they have merits and demerits. Under such existing circumstances, no antioxidant is available which satisfies all the requirements when used alone.

More specifically, in the method (1), in which an antioxidant which is liquid at normal temperature is directly added in a polymerization mixture, problems have remained unsettled such that, when added in a small quantity, the antioxidant has an insufficient ability of polymerization termination and lowers the anti-initial-discoloration properties and thermal stability of polymers.

In the method (2), in which a solution prepared by dissolving in an organic solvent an antioxidant which is powdery at normal temperature is added, there is a problem that, when a vinyl chloride monomer is polymerized in an aqueous medium, the organic solvent used to dissolve the antioxidant is discharged in the waste water after polymerization, resulting in a high COD in waste water. The organic solvent is contained in the resulting vinyl chloride polymer, causing an unpleasant odor of products or in processing the polymer, or it is incorporated into unreacted monomers in recovery thereof. Also, some types of antioxidants have a low solubility in various organic solvents. In such a case, the organic solvent must be used in a large quantity, and this makes the above problems more serious.

In the method (3), in which an antioxidant which is powdery at normal temperature is added as an aqueous dispersion by the aid of an emulsifying agent or a suspending agent, it is usually difficult to obtain two or more antioxidants as a single stable aqueous dispersion. Accordingly, in the use of two or more antioxidants, there has been a problem that some installation (tanks, piping, pumps, etc.) used exclusively for their addition is required, resulting in a high cost.

In any methods of addition, it has also been difficult to keep polymerization conversion constant, and has been difficult to obtain vinyl chloride polymers having less uneven plasticizer absorption.

SUMMARY OF THE INVENTION

Accordingly, an object of the present invention is to provide a process for producing a vinyl chloride polymer which process is well operable, enables polymerization to be sufficiently terminated using an antioxidant in a small quantity and enables production of vinyl chloride polymers having less uneven plasticizer absorption and having both good anti-initial-discoloration properties and good thermal stability.

To achieve the above object, the present invention provides a process for producing a vinyl chloride polymer; the process comprising the steps of polymerizing in an aqueous medium a vinyl chloride monomer alone or a mixture of a vinyl chloride monomer and a monomer copolymerizable with the vinyl chloride monomer, and adding an antioxidant to starting materials or a polymerization reaction mixture;

the antioxidant comprising a mixed antioxidant comprised of an antioxidant A which is liquid at 20° C. and an antioxidant B which is powdery at 20° C.

The vinyl chloride polymer production process of the present invention is well operable, enables polymerization to be sufficiently terminated using an antioxidant in a small quantity and enables production of vinyl chloride polymers having less uneven plasticizer absorption and having both good anti-initial-discoloration properties and good thermal stability, without requiring any installation used exclusively for the addition of antioxidants and any organic solvent.

DETAILED DESCRIPTION OF THE INVENTION

The present invention will be described below in detail.

In the present invention, "initial discoloration" means any color change that may occur when a kneaded product prepared by adding a plasticizer and so forth to a vinyl chloride polymer is molded into a sheet under application of heat and pressure. Thus, the term "anti-initial-discoloration properties" means a resistance the vinyl chloride polymer has, to such color change.

In the vinyl chloride polymer production process of the present invention, an antioxidant is added to starting materials or a polymerization reaction mixture, and a mixed antioxidant comprised of an antioxidant A which is liquid at 20° C. and an antioxidant B which is powdery at 20° C. is used as the antioxidant.

The antioxidant A which is liquid at 20° C. may be an antioxidant having a melting point of 20° C. or below. Such an antioxidant may preferably be a compound which is liquid at 20° C. and also represented by the following general formula (I):

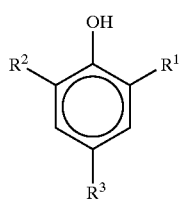

wherein $R^1$ represents a straight-chain or branched-chain alkyl group having 1 to 5 carbon atoms; and $R^2$ and $R^3$ each independently represent a hydrogen atom or a straight-chain or branched-chain alkyl group having 1 to 5 carbon atoms.

In the general formula (1), as examples of the group represented by $R^1$, it may preferably be a t-butyl group, a t-amyl group or an isopropyl group. Also, as examples of the groups represented by $R^2$ and $R^3$, they may each preferably be a hydrogen atom, a t-butyl group or a sec-butyl group.

What is preferred as the compound which is liquid at 20° C. and also represented by the general formula (I) may include 2-isopropylphenol (m.p.: 16° C.), 2-t-butylphenol (m.p.: −5° C.), 2-t-amylphenol (m.p.: −5° C.) and 2,6-di-t-butyl-4-sec-butylphenol (m.p.: 18° C.). What is particularly preferred is 2,6-di-t-butyl-4-sec-butylphenol.

The antioxidant B which is powdery at 20° C. may be an antioxidant having a melting point higher than 20° C., and preferably an antioxidant having a melting point of 35° C. or above. Such an antioxidant B may include oil-soluble antioxidants having a melting point higher than 20° C., commonly used in the production of vinyl chloride polymers, as exemplified by phenolic compounds such as triethylene glycol bis[3-(3-t-butyl-5-methyl-4-hydroxyphenyl) propionate] (m.p.: 75–79° C.), t-butylhydroxyanisole (m.p.: 57° C. or above), 4,4'-butylidenebis(3-methyl-6-t-butylphenol) (m.p.: 208–212° C.), 2,2'-methylenebis(4-methyl-6-t-butylphenol) (m.p.: 130–133° C.), 2,2'-methylenebis(4-ethyl-6-t-butylphenol) (m.p.: 116° C. or above), 2,6-di-t-butyl-4-methylphenol (m.p.: 69° C. or above), 2,6-di-t-butyl-4-ethylphenol (m.p.: 43° C. or above), 2, 6-di-t-butyl-4-hydroxymethylphenol (m.p.: 140° C.), n-octadecyl-3-(4-hydroxy-3,5-di-t-butylphenyl)propionate (m.p.: 50–54° C.), 4,4'-methylenebis(2,6-di-t-butylphenol) (m.p.: 152–154° C.), 4,4'-thiobis(6-t-butylcresol) (m.p.: 161–164° C.), tetrakis[methylene-3-(3,5-di-t-butyl-4-hydroxyphenyl) propion ate] methane (m.p.: 120° C.); phosphorus compounds such as cyclic lyopentanetetraylbis(octadecyl phosphite) (m.p.: 45–50° C.); and sulfur compounds such as dilauryl thiodipropionate (m.p.: 38° C. or above), dimyristyl thiodipropionate (m.p.: 49–54° C.), and distearyl thiodipropionate (m.p.: 59° C. or above). Any of these may be used alone or in combination of two or more types. Of these, 3,5-di-t-butyl-4-hydroxytoluene, triethylene glycol bis[3-(3-t-butyl-5-methyl-4-hydroxyphenyl)propionate], 2,2'-methylenebis(4-ethyl-6-t-butylphenol), 4,4'-butylidenebis (3-methyl-6-t-butylphenol), t-butylhydroxyanisole, t-butylhydroquinone and n-octadecyl-3-(3,5-di-t-butyl-4-hydroxyphenyl)propionate are preferred in view of the advantages that they have a good ability of polymerization inhibition and may cause less scale adhesion to polymerization vessels.

The mixed antioxidant used in the present invention is prepared by mixing the antioxidant A which is liquid at 20° C. and the antioxidant B which is powdery at 20° C. The mixed antioxidant thus obtained usually stands liquid (a solution or a dispersion), depending on the mixing ratio of the antioxidant A to the antioxidant B. The mixing ratio of the antioxidant A to the antioxidant B, A/B, may preferably be in the range of from 9/1 to 2/8 (weight ratio), and preferably from 8/2 to 3/7. If the liquid antioxidant A is in a too small proportion, the mixed antioxidant may have a high viscosity or can no longer be formed in liquid in some cases. If on the other hand it is in a too large proportion, the feature of the antioxidant B can not be exhibited (e.g., the ability of polymerization inhibition is not improved) in some cases. Incidentally, the mixed antioxidant may preferably be prepared at such a temperature that the resultant mixed antioxidant does not solidify (usually at 20° C. or above, and preferably 25° C. or above). It may also preferably be prepared in an atmosphere of nitrogen in order to prevent the antioxidant from oxidation.

The mixed antioxidant thus obtained may preferably be in the form of a solution or a dispersion. In order to obtain a uniform solution, an organic solvent such as methanol or ethanol may also be added. However, when the organic solvent is added, from the viewpoint of controlling the COD of polymerization waste water to a low level, the organic solvent may preferably be controlled in an amount not more than 60% by weight, preferably not more than 40% by weight, and more preferably not more than 30% by weight, based on the total weight of the organic solvent and mixed antioxidant.

With regard to the time at which the antioxidant is added, it may be added before polymerization is initiated, before the internal pressure changes during polymerization, at the time the internal pressure has dropped at the last stage of polymerization, or before, in the course of or after the recovery of residual unreacted monomers after polymerization is completed (in these cases, the antioxidant is added to a polymerization mixture). In particular, it may be added at the time the internal pressure has begun to drop at the last stage of polymerization and this internal pressure has reached a predetermined pressure of 0.3 to 1.0 MPa, whereby the effect of the present invention can remarkably be exhibited.

The mixed antioxidant may be added usually in an amount of from 0.0001 to 0.5 part by weight based on 100 parts by weight of a vinyl chloride monomer alone or a mixture of a vinyl chloride monomer and a monomer copolymerizable with the vinyl chloride monomer, charged into a polymerization vessel (hereinafter the mixture is called "monomer mixture composed chiefly of vinyl chloride"). When added at the time the internal pressure has reached 0.3 to 1.0 MPa, this mixed antioxidant may preferably be added in an amount of from 0.001 to 0.05 parts by weight in view of advantages that, thus the polymerization reaction can more effectively be terminated and also polymers having much better anti-initial-discoloration properties are obtainable.

The monomer material used in the present invention is the vinyl chloride monomer alone or the monomer mixture composed chiefly of vinyl chloride. The monomer mixture composed chiefly of vinyl chloride is a mixture comprised of at least 50% by weight of vinyl chloride and the balance of other monomer copolymerizable with vinyl chloride. Such other monomer copolymerizable with vinyl chloride monomer may include, e.g., vinyl esters such as vinyl acetate and vinyl propionate; acrylates or methacrylates such as methyl acrylate, ethyl acrylate, methyl methacrylate and ethyl methacrylate; olefins such as ethylene and propylene; and maleic acid, acrylonitrile, styrene, and vinylidene chloride. Any of these may be used alone or in combination of two or more types.

The process of the present invention is carried out like a conventional vinyl chloride polymer production process, by polymerizing the above monomer material in an aqueous medium in the presence of a dispersing agent and a polymerization initiator.

The dispersing agent used here may be any of those used in conventional vinyl chloride polymer production processes, without any particular limitations. Such a dispersing agent may include, e.g., water-soluble cellulose ethers such as methyl cellulose, hydroxyethyl cellulose and hydroxypropyl methylcellulose; water-soluble polymers such as water-soluble partially saponified polyvinyl alcohols, acrylic acid polymers and gelatin; oil-soluble emulsifiers such as sorbitan monolaurate, sorbitan triolate, glycerol tristearate and an ethylene oxide/propylene oxide block copolymer; and water-soluble emulsifiers such as polyoxyethylene sorbitan monolaurate, polyoxyethylene glycerol oleate and sodium laurate. Any of these may be used alone or in combination of two or more types. It may be used in an amount usually ranging from 0.01 to 3 parts by weight based on 100 parts by weight of the monomer material.

The polymerization initiator used in the process of the present invention may also be any of those used in conventional vinyl chloride polymer production processes, without any particular limitations. For example, it may include peroxy carbonate compounds such as diisorpopyl peroxydicarbonate, di-2-ethyhexyl peroxydicarbonate and diethoxyethyl peroxydicarbonate; peroxyester compounds such as t-butyl peroxypivarate, t-hexyl peroxypivarate, t-butyl peroxyneodecanate and a-cumyl peroxyneodecanate; peroxides such as acetylcyclohexylsulfonyl peroxide, 2,4,4-trimethylpentyl-2-peroxyphenoxyacetatae, 3,5,5-trimethylhexanoyl peroxide; azo compounds such as azobis-2,4-dimethylvalelonitrile and azobis-(4-methoxy-2,4-dimethylvalelonitrile; and potassium peroxide, ammonium peroxide and hydrogen peroxide. Any of these may be used alone or in combination of two or more types. It may be used in an amount usually ranging from 0.01 to 1 part by weight based on 100 parts by weight of the monomer material.

As the aqueous medium, water (pure water or deionized water) may be used. The aqueous medium may be used in an amount usually ranging from 80 to 300 parts by weight based on 100 parts by weight of the monomer material.

Other conditions in polymerization, e.g., the manner of charging the aqueous medium, monomer material, dispersing agent, polymerization initiator and so forth in the polymerization vessel, charging proportion, polymerization temperature and so forth may also be the same as those in conventional processes. For example, the polymerization temperature may be about 40° C. to about 70° C. Also, the polymerization process may be either of suspension polymerization and emulsion polymerization.

In the process of the present invention, polymerization degree adjusters, chain transfer agents, pH adjusters, gelation modifiers, antistatic agents and so forth which are commonly used in the production of vinyl chloride polymers may appropriately be used as occasion calls. Also, for the purposes of, e.g., controlling polymerization reaction and preventing deterioration of polymers formed, the antioxidant may be added to the polymerization mixture or polymerization reaction product before polymerization is initiated, before the internal pressure changes during polymerization or after the polymerization is completed.

EXAMPLES

The present invention will be described below in greater detail by giving Examples. The present invention is by no means limited to these.

Example 1

Into a polymerization vessel made of stainless steel, having an inner volume of 2 $m^3$, 980 kg of deionized water, 382 g of partially saponified polyvinyl alcohol with a degree of saponification of 80.5 mole % and 143 g of hydroxypropyl methylcellulose with a degree of methoxy-substitution of 28.5% by weight and a degree of hydroxypropoxy-substitution of 8.9% by weight were charged. After the interior of the polymerization vessel was evacuated up to an internal pressure of 60 mmHg (−0.09 MPa), 700 kg of vinyl chloride monomer was charged. Then as a polymerization initiator 350 g of di-2-ethylhexyl peroxydicarbonate was charged with stirring and simultaneously temperature was begun to be raised by letting hot water run through the jacket of the polymerization vessel to initiate polymerization. At the time the temperature inside the polymerization vessel was further raised to 57.0° C., this temperature was maintained to continue the polymerization.

At the time the internal pressure of the polymerization vessel dropped to 0.588 MPa (polymerization conversion at this state was 86%), an antioxidant liquid I (prepared at 25° C.) shown in Table 1 was added to the interior of the polymerization vessel in the amount shown in Table 1. After the polymerization was completed, unreacted monomers were recovered from the polymerization vessel, and the polymer slurry obtained was dehydrated and dried to obtain a vinyl chloride polymer. The plasticizer absorption, anti-initial-discoloration properties and thermal stability of the polymer obtained were measured by the methods described below, and also the COD of polymerization waste water discharged out of the polymerization vessel (a stage of production) was measured according to JIS K0102. Results obtained are shown in Table 2.

Plasticizer absorption:

400 g of the polymer was introduced into a Brabender Plastograph having a stirrer, with its heating jacket temperature being set at 80° C. and was preheated for 4 minutes with stirring. Thereafter, 200 g of DOP was added, and the time until it dried up was measured.

Anti-initial-discoloration properties:

In 100 parts by weight of the polymer, 1 part by weight of tin laurate, 0.5 part by weight of a cadmium type stabilizer and 50 parts by weight of dioctyl phthalate were compounded, followed by kneading at 160° C. for 5 minutes by means of a roll mill. Then, the kneaded product obtained was molded by press molding to prepare a sheetlike sample. On the basis of a sheetlike sample prepared from the polymer of Example 1, a sample showing substantially the same initial discoloration as that was evaluated as "○"; a sample showing more initial discoloration than that, as "Δ"; and a sample showing extremely great initial discoloration, as "X".

Thermal stability:

The sheetlike sample prepared for measuring the anti-initial-discoloration properties was put in a Geer oven kept at 185° C., and the time until the sample blackened was measured.

Example 2, Comparative Examples 1 to 3

Vinyl chloride polymers were produced in the same manner as in Example 1 except that the antioxidant liquid I was replaced with antioxidant liquids II, III, IV or V (all prepared at 25° C.) shown in Table 1. The plasticizer absorption, anti-initial-discoloration properties, thermal stability and polymerization waste water COD of the polymers obtained were measured in the same manner as in Example 1. Results obtained are shown in Table 2.

As can be seen from the results of Examples 1 and 2 and Comparative Examples 1 to 3, the vinyl chloride polymers obtained by the process of the present invention had all good plasticizer absorption, anti-initial-discoloration properties and thermal stability and showed a low COD of polymerization waste water.

TABLE 1

| | Composition of antioxidant liquid | Amount of antioxidant (parts by weight) |
|---|---|---|
| Antioxidant liquid I: | 2,6-di-t-butyl-4-sec-butylphenol (m.p.: 18° C.) | 50 |
| | triethylene glycol bis [3-(3-t-butyl-5-methyl-4-hydroxyphenyl)propionate] (m.p.: 77° C.) | 50 |
| Antioxidant liquid II: | 2,6-di-t-butyl-4-sec-butylphenol (m.p.: 18° C.) | 60 |
| | 2,2'-methylenebis(4-ethyl-6-t-butylphenol) (m.p.: 116° C.) | 40 |
| Antioxidant liquid III: | 35% by weight acetone solution of triethylene glycol bis [3-(3-t-butyl-5-methyl-4-hydroxyphenyl)propionate] (m.p.: 77° C.) | 35 |
| Antioxidant liquid IV: | 2,6-di-t-butyl-4-sec-butylphenol (m.p.: 18° C.) | 100 |
| Antioxidant liquid V: | 20% by weight methanol solution of 2,2'-methylenebis (4-ethyl-6-t-butylphenol) (m.p.: 116° C.) | 20 |

TABLE 2

| | Example 1 | Example 2 | Comparative Example 1 | Comparative Example 2 | Comparative Example 3 |
|---|---|---|---|---|---|
| Antioxidant liquid: | I | II | III | IV | V |
| Amount of antioxidant added* | 0.01 | 0.01 | 0.01 | 0.01 | 0.01 |
| Plasticizer absorption (minute) | 15.5 | 15.4 | 15.4 | 16.2 | 15.3 |
| Anti-initial-discoloration properties: | ○ | ○ | ○ | ○ | X |

TABLE 2-continued

| | Example 1 | Example 2 | Comparative Example 1 | Comparative Example 2 | Comparative Example 3 |
|---|---|---|---|---|---|
| Thermal stability (min): | 90 | 85 | 95 | 85 | 80 |
| COD of polymerization waste water: | 75 | 63 | 330 | 66 | 450 |

*parts by weight of the mixed antioxidant (Examples) or antioxidant (Comparative Example) based on 100 parts by weight of the monomer charged.

Example 3

Into a polymerization vessel made of stainless steel, having an inner volume of 100 L (liter), 60 kg of deionized water, 18 g of partially saponified polyvinyl alcohol with a degree of saponification of 80.5 mole %, 12 g of hydroxypropyl methylcellulose with a degree of methoxy-substitution of 28.5% by weight and a degree of hydroxypropoxy-substitution of 8.9% by weight and as a polymerization initiator 21 g of di-2-ethylhexyl peroxydicarbonate were charged. After the interior of the polymerization vessel was evacuated up to an internal pressure of 60 mmHg, 30 kg of vinyl chloride monomer was charged, and, with stirring, temperature was begun to be raised by letting hot water run through the jacket to initiate polymerization. At the time the temperature inside the polymerization vessel was further raised to 57° C., this temperature was maintained to continue the polymerization.

On a lapse of 1 hour after the polymerization was initiated (in the course of polymerization), the antioxidant liquid I shown in Table 1 was added. As a result of this addition, the polymerization reaction was greatly inhibited, and it was confirmed that the polymerization was terminated.

Example 4

Polymerization was carried out in the same manner as in Example 3 except that in place of the antioxidant liquid I 30 g of the antioxidant liquid II was added. At the time the antioxidant liquid II was added in the course of polymerization, the polymerization reaction was greatly inhibited, and it was confirmed that the polymerization was terminated.

Comparative Example 4

Polymerization was carried out in the same manner as in Example 3 except that in place of the antioxidant liquid I 30 g of the antioxidant liquid IV was added. At the time the antioxidant liquid II was added in the course of polymerization, the inhibition of polymerization reaction was insufficient, and it was confirmed that the polymerization was not terminated.

It was confirmed from the results of Example 3 and 4 and Comparative Example 4 that the mixed antioxidant used in the present invention has a good ability of polymerization inhibition.

What is claimed is:
1. A process for producing a vinyl chloride polymer, comprising: polymerizing, in an aqueous medium, a starting material comprising a vinyl chloride monomer alone or a mixture of a vinyl chloride monomer and a monomer copolymerizable with the vinyl chloride monomer, and adding an antioxidant to the starting material or the polymerization reaction mixture;
said antioxidant comprising a mixed antioxidant comprised of an antioxidant A which is liquid at 20° C. and has the formula:

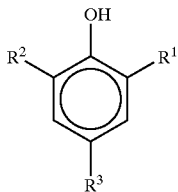

R$^1$ is t-butyl, t-amyl or isopropyl and R$^2$ and R$^3$ are each hydrogen, t-butyl or sec-butyl and an antioxidant B which is powdery at 20° C., wherein antioxidants A and B are mixed in a weight ratio A/B ranging from 9/1 to 2/8.

2. The process according to claim 1, wherein said antioxidant A is selected from the group consisting of 2-isopropylphenol, 2-t-butylphenol, 2-t-amylphenol and 2,6-di-t-butyl-4-sec-butylphenol.

3. The process according to claim 1, wherein said antioxidant A is 2,6-di-t-butyl-4-sec-butylphenol.

4. The process according to claim 1, wherein said antioxidant B is selected from the group consisting of triethylene glycol bis[3-(3-t-butyl-5-methyl-4-hydroxyphenyl) propionate], t-butylhydroxyanisole, 4,4'-butylidenebis(3-methyl-6-t-butylphenol), 2,2'-methylenebis(4-methyl-6-t-butylphenol), 2,2'-methylenebis(4-ethyl-6-t-butylphenol), 2,6-di-t-butyl-4-methylphenol, 2,6-di-t-butyl-4-ethylphenol, 2,6-di-t-butyl-4-hydroxymethylphenol, n-octadecyl-3-(4-hydroxy-3,5-di-t-butylphenyl)propionate, 4,4'-methylenebis(2,6-di-t-butylphenol), 4,4'-thiobis(6-t-butyl-m-cresol), tetrakis[methylene-3-(3,5-di-t-butyl-4-hydroxyphenyl)propionate] methane, cyclic lyopentanetetraylbis(octadecyl phosphite), dilauryl thiodipropionate, dimyristyl thiodipropionate and distearyl thiodipropionate.

5. The process according to claim 1, wherein said antioxidant B is selected from the group consisting of 3,5-di-t-butyl-4-hydroxytoluene, triethylene glycol bis[3-(3-t-butyl-5-methyl-4-hydroxyphenyl)propionate], 2,2'-methylenebis(4-ethyl-6-t-butylphenol), 4,4'-butylidenebis(3-methyl-6-t-butylphenol), t-butylhydroxyanisole, t-butylhydroquinone and n-octadecyl-3-(3,5-di-t-butyl-4-hydroxyphenyl) propionate.

6. The process according to claim 1, wherein the mixing ratio (A/B) of said antioxidant A and antioxidant B is in the range of from 8/2 to 3/7 in weight ratio.

7. The process according to claim 1, wherein said mixed antioxidant is added in the form of a solution or a dispersion.

8. The process according to claim 1, wherein said mixed antioxidant is added in the starting materials charged into a polymerization vessel before the initiation of polymerization, before the internal pressure changes during polymerization, at the time the internal pressure has dropped at the last stage of polymerization, or before, in the course of or after the recovery of residual unreacted monomers after polymerization is completed.

9. The process according to claim 1, wherein said mixed antioxidant is present in an amount ranging from 0.0001 to 0.5 part by weight based on 100 parts by weight of the vinyl chloride monomer or the mixture of monomers including the vinyl chloride monomer and a monomer copolymerizable therewith.

10. The process according to claim 1, wherein said mixed antioxidant is added at the time the internal pressure has begun to drop at the last stage of polymerization and the internal pressure has reached 0.3 MPa to 1.0 MPa.

11. The process according to claim 10, wherein said mixed antioxidant is present in an amount ranging from 0.001 to 0.05 part by weight based on 100 parts by weight of the vinyl chloride monomer or the mixture of monomers including the vinyl chloride monomer and a monomer copolymerizable therewith.

* * * * *